3,262,843
NEMATOCIDES
Frederick Charles Peacock, Bracknell, England, assignor to Imperial Chemical Industries Limited, London, England, a corporation of Great Britain
No Drawing. Filed Dec. 27, 1963, Ser. No. 334,027
Claims priority, application Great Britain, Dec. 28, 1962, 48,933/62
11 Claims. (Cl. 167—22)

This invention relates to the use of substituted dithio-oxamides as nematocides. This invention also provides a method for improving crops formed by plants growing in soil infested with nematodes comprising incorporating with this oil a dithio-oxamide having at least one olefinically unsaturated hydrocarbon substituent and subsequently harvesting the crops produced by the plants.

Preferred dithio-oxamides have the formula

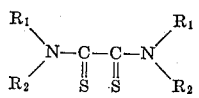

wherein $R_1$ and $R_2$ which may be the same or different comprise alkylene groups containing from 2 to 5 carbon atoms. Especially good results have been obtained by using N,N'-diallyldithio-oxamide. This compound has been found not only to be very effective against various nematodes, e.g., *Meloidogyne incognita* and *Heterodera rostochiensis* but furthemore, unlike other thio-oxamides it lends itself with unexpected ease to being converted into compositions suitable for large scale use.

The unformulated compounds may be applied directly to the soil. However, a more satisfactory method is first to form a concentrated composition containing the compound which may then be diluted before application. The composition whether concentrated or dilute may contain a wetting agent and a solvent for the compound. Suitable wetting agents include calcium or sodium dodecyl benzene sulphonate, butyl naphthalene sulphonate and condensation products of ethylene oxide with octyl phenol, nonyl phenol, sorbitan monolaurate, oleyl alcohol and cetyl alcohol. Plants are often very sensitive towards organic solvents when the latter are brought into contact with their roots and certain solvents which may safely be used in the formulation of pesticides for application to parts of plants which extend above the surface of the soil cannot always be used in soil which is to maintain contact with the roots of the plant. Solvents which have been found useful in the formulation of the present compounds and which exert low phytotoxic activity include a polyethylene glycol, diethyl carbonate, ethylene dichloride and n-butanol.

The amounts of the compound which can be used in the composition may vary between wide limits. A concentrated composition may contain from 10–80% by weight of the compound, whilst the diluted composition which is suitable for applicatiion without further treatment usually contains from 0.1–1.0% by weight.

In order to ensure that as much as possible of the root system of the plant is protected from attack by nematodes, it is important that sufficient of the compound is applied to the soil to enable at least a major proportion of the root system of the plant to be surrounded by treated soil. In the case of plants growing in fields or in beds, either in the open or in greenhouses, a convenient method of application is to drench the surface of the soil with sufficient of a dilute solution or dispersion of the compound to ensure that the composition soaks down to sufficient depth. However, when the plants are growing in pots or in other containers it is sometimes convenient to mix soil to be used for potting purposes mechanically with a powder composition. Whatever method of application is employed however, the soil should contain from 5 to 500 parts per million of the compound and usually from 10 to 200 parts. The quantity of compound which gives the best results depends to a substantial extent upon the kind of soil in which it is to be treated. Since the nature of the soil varies greatly from one locality to another, the preferred amount of compound to be used can be determined by simple experiment using different quantities of the compound and finding which quantity results in the greatest improvement to crops. In general however excellent results are usually obtainable by using the quantities indicated above.

The compositions may be applied either before, during or after planting. In general however it is preferable to make the application a short period before, i.e., from 1 to 3 weeks before planting to ensure that the population of nematodes is reduced to a substantial extent in order to reduce further the risk of infestation of the plant.

The compositions may be used in the protection and disinfestation of a wide variety of crop producing plants, e.g. tomatoes, tobacco, cotton and sugar cane. They may also be used to protect and improve plants grown for ornamental purposes and assist in the production of better and greater yields of flowers which are cut for sale. The term "crops" is therefore taken to include both whole plants or parts of plants.

This invention is illustrated by the following example;

*Example*

This example demonstrates the greater yield of tomatoes which were obtained when tomato plants are grown in soil infested with two types of nematodes, namely *Meloidogyne incognita* and *Heterodera rostochiensis* and treated with N,N'-diallyldithio-oxamide compared with the yields obtained when similar plants were grown in untreated soil infested with the same organisms.

A concentrated composition was prepared containing the following ingredients in the proportions stated. Percentages are expressed by weight of the composition.

| | Percent |
|---|---|
| N,N'-diallyldithio-oxamide | 25 |
| Condensation product of nonyl phenol and ethylene oxide | 25 |
| Triethanolamine salt of dodecyl benzene sulphonic acid | 25 |
| Polyethylene glycol | 25 |

The concentrate was then diluted with water at rate of 150 grams of the composition per 15 gallons of water. This diluted solution was then applied at a rate of 15 gallons per 4 square yards over ground, infested with the nematode, which had been freshly prepared for planting. This application rate was sufficient to ensure that the ground which would be occupied by a major proportion of the roots of the tomato plants would contain about 50 parts per million of active material.

Fourteen days later young plants, 6" high known to the trade as "money-maker" were planted in the treated soil and subsequently the tomato crops were picked at weekly intervals and their weights recorded. At the end of the season 256 lb. of tomatoes had been picked compared with only 226 lb. which were picked from a similar number of plants growing in untreated soil. A similar test was carried out using only half the amount of active compound and as a result 243 lb. of tomatoes were picked.

What I claim is:

1. A process of improving crops formed by plants growing in soil infested with nematodes comprising incorporating with the soil an effective amount of a dithio-oxamide having at least one olefinically unsaturated aliphatic hydrocarbon substituent containing from 2 to 5 carbon atoms.

2. A process according to claim 1 wherein the dithio-oxamide is one having the formula:

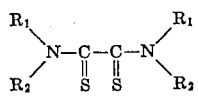

wherein $R_1$ and $R_2$ are alkylene of from 2–5 carbon atoms.

3. A process according to claim 1 wherein the dithio-oxamide is N,N'-diallyldithio-oxamide.

4. A process according to claim 1 wherein the soil is treated with from 10 to 200 parts per million of the dithio-oxamide.

5. A process according to claim 1 wherein the dithio-oxamide is in the form of a composition containing a wetting agent.

6. A nematocidal composition comprising a nematocidal amount of a dithio-oxamide having at least one olefinically unsaturated aliphatic hydrocarbon substituent containing from 2 to 5 carbon atoms and a wetting agent.

7. A nematocidal composition according to claim 6 containing 10 to 80% by weight of the dithio-oxamide.

8. A pesticidal composition comprising 10–80% by weight of N,N'-diallyldithio-oxamide dissolved in a non-phytotoxic solvent.

9. A pesticidal composition according to claim 8 including a wetting agent.

10. A pesticidal composition comprising a nematocidal amount of N,N'-diallyldithio-oxamide, as the pesticidal component, a wetting agent, a non-phytotoxic organic solvent and water.

11. The composition of claim 10 wherein the wetting agent is an alkylated phenol/ethylene oxide condensation product and the organic solvent is polyethylene glycol.

References Cited by the Examiner

UNITED STATES PATENTS 3,010,870  11/1961  Luckenbaugh _____ 167—42 X

OTHER REFERENCES

Chemical Abstracts, vol. 52, entry 2256G, 2257b, 1958, Citing Miller et al., J. Pharmacol, Exptl. Therap., 121, 32–42 (1957).

Chemical Abstracts, vol. 56 p. 1570S, col. 1, 1962.

LEWIS GOTTS, *Primary Examiner.*

JULIAN S. LEVITT, *Examiner.*

R. HUFF, *Assistant Examiner.*